United States Patent [19]

Iizuka et al.

[11] Patent Number: 4,957,954
[45] Date of Patent: Sep. 18, 1990

[54] STABILIZER COMPOSITIONS FOR POLYVINYL CHLORIDE RESINS AND STABILIZED POLYVINYL CHLORIDE RESIN COMPOSITIONS

[75] Inventors: Shunichi Iizuka, Tatebayashi; Yoshiyuki Sakamaki, Toyonaka; Noriyuki Shimoyama, Urawa, all of Japan

[73] Assignee: Adeka Argus Chemical Co., Ltd., Urawa, Japan

[21] Appl. No.: 301,930

[22] Filed: Jan. 25, 1989

Related U.S. Application Data

[62] Division of Ser. No. 896,475, Aug. 13, 1986, abandoned.

[30] Foreign Application Priority Data

Aug. 13, 1985 [JP] Japan .................................. 60-178323

[51] Int. Cl.$^5$ ...................... C08K 5/3435; C08K 3/10; C08K 3/28

[52] U.S. Cl. ...................................... 524/102; 524/100; 524/111; 524/118; 524/119; 524/120; 524/141; 524/148; 524/151; 524/153; 524/159; 524/171; 524/316; 524/321; 524/324; 524/326; 524/330; 524/334; 524/335; 524/336; 524/337; 524/338; 524/428; 524/436; 428/424.6; 521/119

[58] Field of Search ............... 524/102, 428, 436, 100, 524/111, 118, 119, 120, 141, 148, 151, 153, 157, 171, 316, 321, 324, 326, 330, 334, 335, 336, 337, 338; 428/424.6; 521/119

[56] References Cited

U.S. PATENT DOCUMENTS

| | | | |
|---|---|---|---|
| 2,483,959 | 10/1949 | Baer | 524/436 |
| 3,446,765 | 5/1969 | Pryer | 524/436 |
| 3,759,856 | 9/1973 | Rhodes et al. | 524/436 |
| 3,840,494 | 10/1974 | Murayama et al. | 524/102 |

*Primary Examiner*—Kriellion Morgan

[57] ABSTRACT

Polyvinyl chloride resin stabilizer compositions are provided, comprising a 2,2,6,6-tetramethyl piperidinyl compound and an ammonium or metal perchlorate; and also stabilized polyvinyl chloride resin compositions containing such stabilizers, and optionally including a plasticizer, and particularly as molded articles with polyurethane foam backing.

18 Claims, No Drawings

STABILIZER COMPOSITIONS FOR POLYVINYL CHLORIDE RESINS AND STABILIZED POLYVINYL CHLORIDE RESIN COMPOSITIONS

This is a division of application Ser. No. 896,475, filed Aug. 13, 1986, now abandoned.

Polyvinyl chloride resin articles molded with a polyurethane foam backing are used as interior components for automobiles, including instrument panels, glove compartments, door handles, and arm and head rests. Organotin mercaptides and barium-zinc carboxylates are the stabilizers normally used in such molded compositions. The use of perchlorate salts in a blend of polyvinyl chloride and polyurethane is disclosed in Japan Kokai No. 84-184240.

However, these stabilizers do not impart sufficient resistance to deterioration when the moldings are exposed to ultraviolet light, and resistance to deterioration when heated even at relatively low temperatures is also poor. These problems are accentuated when the moldings are thin. Powder molding processes such as rotomolding, slush molding and fluidization dip molding are used to prepare thin skin molded articles from powdered polyvinyl chloride resins and in these processes a high heat stability is required.

In accordance with the present invention, polyvinyl chloride resin compositions are provided having improved resistance to deterioration when exposed to heat and ultraviolet light, as well as anti-fogging properties, comprising a 2,2,6,6-tetramethyl piperidyl compound and an ammonium or metal perchlorate. These polyvinyl chloride resin compositions are particularly useful for molding with a backing of polyurethane foam, and optionally can include a polyvinyl chloride resin plasticizer, as well as other polyvinyl chloride resin heat and light stabilizers.

Accordingly, the invention also provides stabilizer compositions for polyvinyl chloride resins comprising a 2,2,6,6-tetramethyl piperidyl compound and an ammonium or metal perchlorate, capable of improving the resistance of polyvinyl chloride resins to deterioration upon exposure to heat and ultraviolet light, as well as imparting anti-fogging properties to the resin composition.

The metal perchlorate is an alkali metal, alkaline earth metal or aluminium salt of perchloric acid. Lithium, sodium, potassium, magnesium, calcium, strontium, barium, zinc and aluminum perchlorates are all effective. The alkaline earth metal perchlorates are preferred. For the purposes of this invention magnesium is regarded as an alkaline earth metal. The ammonium perchlorates include ammonium salts of perchloric acid, and the tertiary amine salts of perchloric acid, such as triethylamine perchlorate, trimethylamine perchlorate, tripropylamine perchlorate, tributylamine perchlorate, trihexylamine perchlorate, ethyldimethylamine perchlorate, propyldiethylamine perchlorate, and tricyclohexylamine perchlorate. Also included are the basic metal salts of inorganic acids in which part of the inorganic acid is perchloric acid, such as the double salts of hydrotalcites and perchloric acid, for example, $Mg_{0.7}Al_{0.3}(OH)_2(CO_3)_{0.15}0.54H_2O$ reacted with perchloric acid.

The amount of perchlorate is within the range from about 0.001 to about 3 parts, preferably from about 0.01 to about 2 parts, by weight per 100 parts by weight of polyvinyl chloride resin.

The light stabilizer is any compound having a 2,2,6,6-tetramethyl piperidyl group

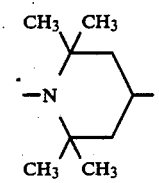

A preferred class of 2,2,6,6-tetramethyl piperidyl compounds has the formula:

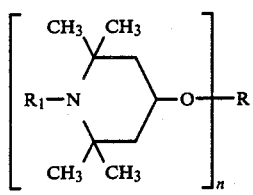

wherein:
$R_1$ is hydrogen or alkyl having from one to about eighteen carbon atoms;
R is a residue of a carboxylic acid having from one to about six carboxylic acid groups, of the formula.

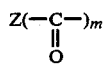

where m is a number from one to six and Z is selected from the group consisting of alkylene, cycloalkylene, mixed alkylene-cycloalkylene, arylene and mixed alkylene-arylene having from one to about thirty carbon atoms; and
n is a number from one to six.

Exemplary $R_1$ alkyl include methyl, ethyl, propyl, isopropyl, butyl, isobutyl, tert-butyl, amyl, isoamyl, hexyl, heptyl, octyl, isooctyl, 2-ethylhexyl, nonyl, isononyl, decyl, dodecyl, myristyl, palmityl, and stearyl.

Exemplary Z alkylene include methylene, ethylene, propylene, isopropylene, butylene, isobutylene, amylene, isoamylene, hexylene, isohexylene, neopentylene, neohexylene, heptylene, octylene, nonylene, decylene, dodecylene and octadecylene.

Exemplary Z cycloalkylene include cyclopentylene, cyclohexylene, cycloheptylene, cyclooctylene.

Exemplary Z arylene include phenylene and naphthylene.

Exemplary mixed alkylene-cycloalkylene include methyl-cyclopentylene, dimethyl-cyclohexylene, trimethyl-cyclohexylene and diethyl-cyclohexylene.

Exemplary Z mixed alkylene arylene include phenmethylene, phenethylene, xylylene, mesitylene, phenpropylene, and phenhexylene.

Exemplary 2,2,6,6-tetramethyl piperidyl compounds include:
1. 4-Benzoyloxy-2,2,6,6-tetramethylpiperidine
2. 1-(3,5-Di-t-butyl-4-hydroxyphenylpropionyloxyethyl)-4-(3,5-di-t-butyl-4-hydroxyphenylpropionyloxy)-2,2,6,6-tetramethylpiperidine
3. 4-(3,5-Di-t-butyl-4-hydroxyphenylpropionyloxy)-2,2,6,6-tetramethylpiperidine
4. Bis(2,2,6,6-tetramethyl-4-piperidyl) sebacate 5. Bis(1,2,2,6,6-pentamethyl-4-piperidyl) sebacate
6. Bis(1,2,2,6,6-pentamethyl-4-piperidyl)-2-butyl-2-(3,5-di-t-butyl-4-hydroxybenzyl) malonate
7. Bis(1-acryloyl-2,2,6,6-tetramethyl-4-piperidyl)-2-butyl-2-(3,5-di-t-butyl-4-hydroxybenzyl) malonate
8. Bis(9-aza-8,8,10,10-tetramethyl-3-ethyl-1,5-dioxaspiro[5.5]-3-undecylmethyl) methyliminodiacetate
9. Bis(2,2,6,6-tetramethyl-4-piperidyl-1-oxyl) sebacate
10. Tris(2,2,6,6-tetramethyl-4-piperidyl) citrate
11. Tris(2,2,6,6-tetramethyl-4-piperidyl) nitrilotriacetate
12. Tris(2,2,6,6-tetramethyl-4-piperidyl) butanetricarboxylate
13. Tris(2,2,6,6-tetramethyl-4-piperidyl) trimellitate
14. Tetra(2,2,6,6-tetramethyl-4-piperidyl) pyromellitate
15. Tetra(2,2,6,6-tetramethyl-4-piperidyl)-1,3-bis-(aminomethyl)-cyclohexanetetraacetate
16. Tetra(2,2,6,6-tetramethyl-4-piperidyl)-1,2,3,4-butanetetracarboxylate
17. Tris(2,2,6,6-tetramethyl-4-piperidyl)-mono(isotridecyl)-1,2,3,4-butanetetracarboxylate
18. Tetra(1,2,2,6,6-pentamethyl-4-piperidyl)-1,2,3,4-butanetetracarboxylate
19. Tris(1,2,2,6,6-pentamethyl-4-piperidyl)-mono(isotridecyl)-1,2,3,4-butanetetracarboxylate
20. Bis(1,2,2,6,6-pentamethyl-4-piperidyl)-di(isotridecyl)-1,2,3,4-butanetetracarboxylate
21. Bis(2,2,6,6-tetramethyl-4-piperidyl)-di(isotridecyl)-1,2,3,4-butanetetracarboxylate
22. Bis(2,2,6,6-tetramethyl-1-oxyl-4-piperidyl)-di(isotridecyl)-1,2,3,4-butanetetracarboxylate
23. Mono(1,2,2,6,6-pentamethyl-4-piperidyl)-monomethylsebacate
24. 3,9-Bis(1,1-dimethyl-2-(tris(2,2,6,6-tetramethyl-4-piperidyloxycarbonyl)butylcarbonyloxy)ethyl)-2,4,8,10-tetraoxaspiro[5.5]undecane
25. 3,9-Bis(1,1-dimethyl-2-(tris(1,2,2,6,6-pentamethyl-4-piperidyloxycarbonyl)butylcarbonyloxy)ethyl)-2,4,8,10-tetraoxaspiro[5.5]undecane
26. 2,4,6-Tris(2,2,6,6-tetramethyl-4-piperidyloxy)-s-triazine
27. 2-Butylamino-4,6-bis(9-aza-8,8,10,10-tetramethyl-3-ethyl-1,5-dioxaspiro[5.5]-3-undecylmethoxy)-s-triazine
28. N,N'-Bis(4,6-bis(9-aza-8,8,10,10-tetramethyl-3-ethyl-1,5-dioxaspiro[5.5]-3-undecylmethoxy)-s-triazine-2-yl) piperazine
29. 1,5,8,12-Tetrakis(4,6-bis(N-(2,2,6,6-tetramethyl-4-piperidyl)butylamino)-1,3,5-triazine-2-yl)-1,5,8,12-tetraazadodecane
30. Bis(9-aza-8,8,10,10-tetramethyl-3-ethyl-1,5-dioxaspiro[5.5]-3-undecylmethyl) carbonate
31. Bis(9-aza-8,8,10,10-tetramethyl-3-ethyl-1,5-dioxaspiro[5.5]-3-undecylmethyl)-hydrogenated Bisphenol A-dicarbonate
32. Bis(2,2,6,6-tetramethyl-4-piperidyl)pentaerythritol-diphosphite
33. Bis(9-aza-8,8,10,10-tetramethyl-3-ethyl-1,5-dioxaspiro[5.5]-3-undecylmethyl)pentaerythritol-diphosphite
34. Tetra(2,2,6,6-tetramethyl-4-piperidyl)-Bisphenol A-diphosphite
35. 3,5-Di-t-butyl-4-hydroxybenzyl-bis(2,2,6,6-tetramethyl-4-piperidyl) phosphonate
36. Condensate of 1-(2-hydroxyethyl)-2,2,6,6-tetramethyl-4-piperidinol with dimethyl succinate
37. Condensate of 2-t-octylamino-4,6-dichloro-s-triazine with N,N'-bis(2,2,6,6-tetramethyl-4-piperidyl) hexamethylenediamine
38. Condensate of 1,6-bis(2,2,6,6-tetramethyl-4-piperidylamino)-hexane with dibromoethane
39. Bis(9-aza-8,8,10,10-tetramethyl-3-hydroxymethyl-1,5-dioxaspiro[5.5]-3-undecylmethyl) ether
40. 3-Glycidyl-8-methyl-7,7,9,9-tetramethyl-1,3,8-triazaspiro[4.5]decane-2,4-dione
41. 3-Dodecyl-8-acetyl-7,7,9,9-tetramethyl-1,3,8-triazaspiro[4.5]decane-2,4-dione
42. 3-Octyl-7,7,9,9-tetramethyl-1,3,8-triazaspiro[4.5]-decane-2,4-dione
43. 2,2,4,4-Tetramethyl-7-oxa-3,20-diazadispiro[5.1.11.2]heneicosane-21-one
44. 3-Dodecyl-1-(2,2,6,6-tetramethyl-4-piperidyl)-2,5-pyrrolidine-dione The amount of 2,2,6,6-tetramethyl piperidyl compound is within the range from about 0.01 to about 3 parts, preferably from about 0.05 to about 1 part, by weight per 100 parts by weight of polyvinyl chloride.

The stabilizer compositions of the invention can be used as stabilizers with any polyvinyl chloride resin. The term "polyvinyl chloride" as used herein is inclusive of any polymer formed at least in part of the recurring group:

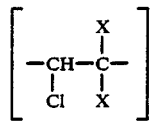

and having a chlorine content in excess of 49%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chloride, such as those disclosed in British patent No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,934,593 to Isaksem et al, that is, syndiotactic polyvinyl chloride, as well as atactic and isotactic polyvinyl chlorides.

The stabilizer combinations of this invention both with and without supplementary heat and light stabilizers are excellent stabilizers for both unplasticized or rigid polyvinyl chloride resins as plasticized polyvinyl chloride resins. The rigid polyvinyl chloride resins are defined as those containing at most 10% plasticizer. Plasticized resins contain at least 10% plasticizer and can contain as much as 50 to 60% plasticizer according to the degree of plasticization desired. When plasticizers are to be employed, they may be incorporated into the polyvinyl chloride resin using conventional means. Conventional plasticizers can be used, such as dioctyl phthalate, dioctyl sebacate and tricresyl phosphate.

Particularly useful plasticizers are the epoxy higher fatty acid esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, can also be included. Typical parting agents are the higher aliphatic acids, and alkali and alkaline earth metal salts of such acids, having twelve to twenty-four carbon atoms, such as stearic acid, lauric acid, palmitic acid and myristic acid, lithium stearate, calcium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylatebutadiene graft copolymers.

The perchlorate-2,2,6,6-tetraalkyl piperidyl stabilizers of the invention can be combined with conventional heat stabilizers such as phenolic antioxidants, polyvalent metal salts of organic acids, organic phosphites, thioethers, organotin compounds, and other known heat stabilizers, thereby constituting light and heat stabilizer compositions of the invention.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

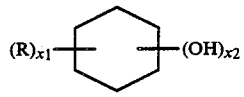

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

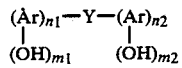

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

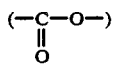

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

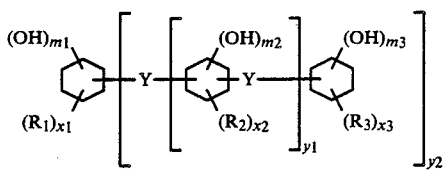

wherein
- $R_1$, $R_2$ and $R_3$ are inert substituent groups as described in the previous paragraph;
- $m_1$ and $m_3$ are integers from one to a maximum of five;
- $m_2$ is an integer from one to a maximum of four;
- $x_1$ and $x_3$ are integers from zero to four, and
- $x_2$ is an integer from zero to three;
- $y_1$ is an integer from zero to about six and
- $y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as:

—CH$_2$—CH$_2$—; —(CH$_2$)$_5$—; —CH$_2$—;

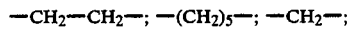

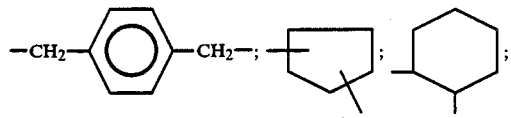

-continued

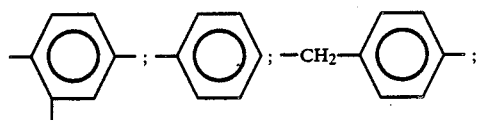

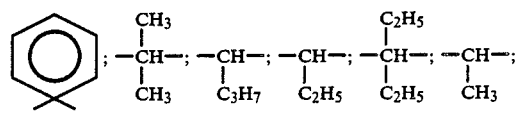

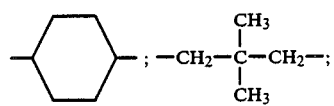

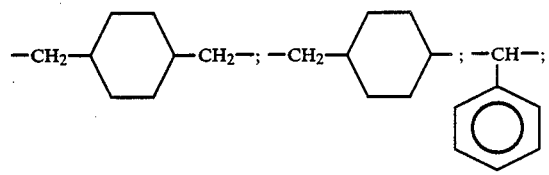

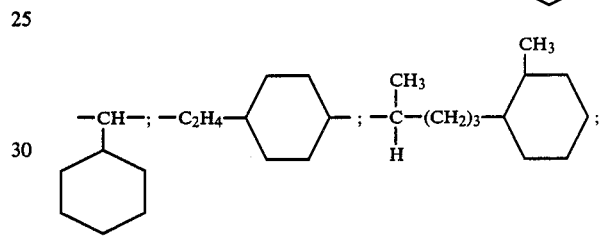

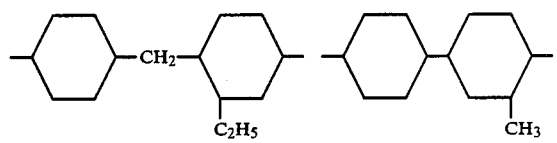

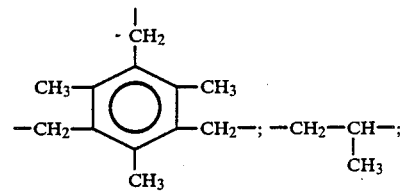

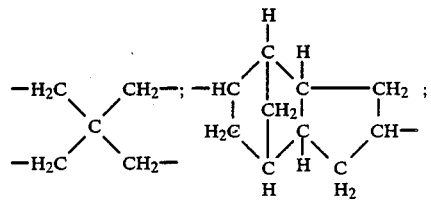

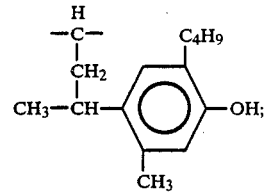

(2) Y groups where only atoms other than carbon link the aromatic rings, such as

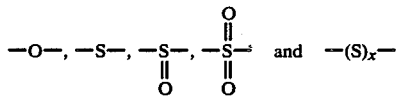

where x is a number from one to ten;

(3) Y groups made up of more than a single atom including both carbon and other atoms linking the aromatic nuclei, such as:

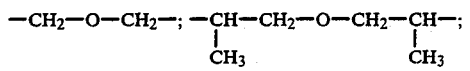

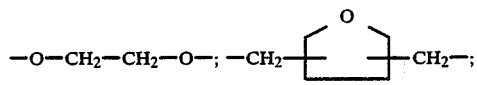

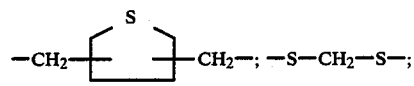

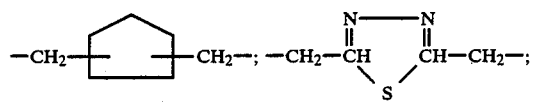

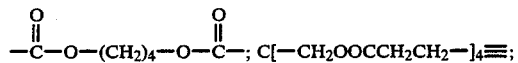

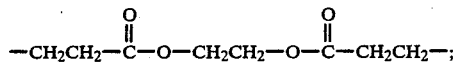

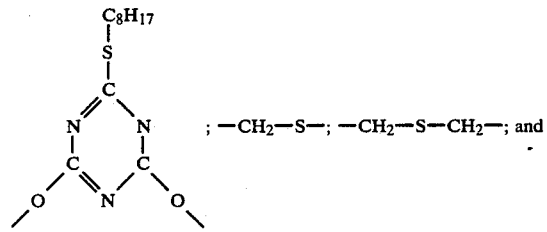

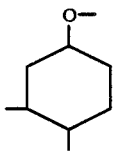

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonylphenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol, methyl-p-hydroxybenzoate, p-di-chlorobenzoyl-aminophenol, p-hydroxysalicyl anilide, stearyl-(3,5-di-methyl-4-hydroxy-benzyl) thioglycolate, stearyl-β-(4-hydroxy-3,5-di-t-butylphenyl) propionate, distearyl-3,5-di-t-butyl-4-hydroxybenzylphosphonate, and distearyl (4-hydroxy-3-methyl-5-t-butyl) benzylmalonate.

Exemplary polyhydric phenols are orcinol, propyl gallate, catechol, resorcinol, 4-octyl-resorcinol, 4-dodecylresorcinol, 4-octadecyl-catechol, 4-isooctyl-phloroglucinol, pyrogallol, hexahydroxybenzene, 4-isohexylcatechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol), 4,4'-benzylidene bis(2-tertiary-butyl-5-methyl-phenol), 4,4'-cyclo-hexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl) butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol), 2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis (naphthalene-1,5-diol), 1,3'-bis-(naphthalene-2,5-diol) propane, and 2,2'-butylene bis-(naphthalene-2,7-diol), (3-methyl-5-tert-butyl-4-hydroxy-phenyl)-4'-hydroxy-phenyl) propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl) ethane, (2-hydroxyphenyl)-(3',5'-di-tert-butyl-4',4-hydroxyphenyl) ethane, 2,2'-methylene-bis-(4-octylphenol), 4,4'-propylene-bis-(2-tert-butyl-phenol), 2,2'-isobutylene-bis-(4-nonyl-phenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl) thiazolo-(5,4-d) thiazole, 2,2'-bis-(3-methyl-5-t-butyl-4-hydroxyphenyl) thiazolo-(5,4-d)-thiazole, 4,4'-bis-(4-hydroxyphenyl) pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol-bis-(3-tert-butyl-4-hydroxyphenoxy acetate), 1,4-butanedio-bis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl) sulfide, bis-(2-tert-butyl-4-hydroxy-5-methylphenyl) sulfide, bis-(2-tert-butyl-4-hydroxy-5-methylphenyl) sulfoxide, bis-(3-ethyl-5-tert-butyl-4-hydroxybenzyl) sulfide, bis-(2-hydroxy-4-methyl-6-tert-butyl-phenyl) sulfide, 4,4'-bis-(4-hydroxyphenol) pentanoic acid octadecyl thiopropionate ester, 1,1,3-tris-(2'-methyl-4-hydroxy-5'-tert-butylphenyl) butane, 1,1,3-tris-(1-methyl-3-hydroxy-4-tert-butylphenyl) butane, 1,8-bis-(2-hydroxy-5-methylbenzoyl-n-octane, 2,2'-ethylene-bis-[4'-(3-tert-butyl-4- hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butylphenol)-bis-[3,3-bis-(4-hydroxy-3-t-butylphenyl) butyric acid] glycol ester, 4,4'-butylidene-bis-(6-t-butyl-m-cresol), 1,1,3-tris-(2-methyl-4-hydroxy-5-t-butylphenyl) butane, 1,3,5-tris-(3,5-di-t-butyl-4-hydroxybenzyl)-2,4,6-trimethylbenzene, tetrakis [methylene-3 (3,5-di-t-butyl-4-hydroxyphenyl)propionate] methane, 1,3,5-tris-(3,5-di-t-butyl-4-hydroxybenzyl) isocyanurate, 1,3,5-tris-(3,5-di-t-butyl-4-hydroxyphenyl) propionyl-oxyethyl isocyanurate, 2-octylthio-4,6-di-(4-hydroxy-3,5-di-t-butyl) phenoxy-1,3,5-triazine, 4,4'-thiobis-(6-t-butyl-m-cresol) and pentaerythritol hydroxyphenyl propionate.

A particularly desirable class of polyhydric polycyclic phenols are the dicyclopentadiene polyphenols, which are of the type:

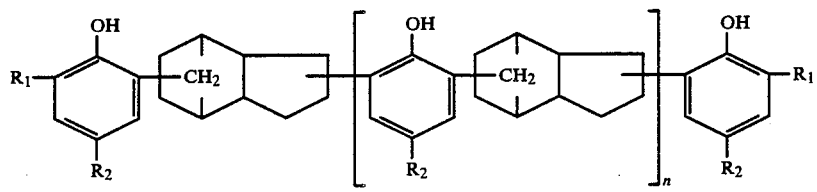

in which
R$_1$ and R$_2$ are lower alkyl, and can be the same or different, and
n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

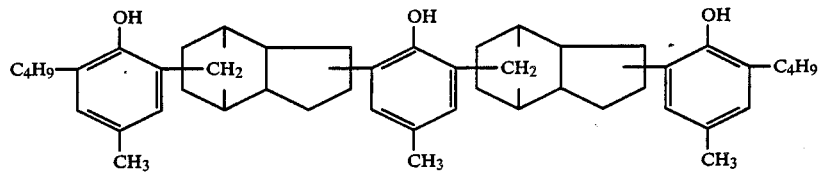

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135, and British patent No. 961,504.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophisphites.

The organic triphosphites in which the radicals are monovalent radicals can be defined by the formula:

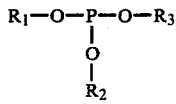

in which

R₁, R₂ and R₃ are selected from the group consisting of alkyl, alkenyl, aryl, alkaryl, aralkyl, and cycloalkyl groups having from one to about thirty carbon atoms.

The acid phosphites are defined by the same formula, but one or two of R₁, R₂ and R₃ is hydrogen or a cation of a metal or ammonium.

Also included are the organic triphosphites having a bivalent organic radical forming a heterocyclic ring with the phosphorus of the type:

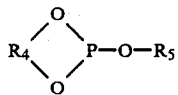

in which

R₄ is a bivalent organic radical selected from the group consisting of alkylene, arylene, aralkylene, alkarylene and cycloalkylene radicals having from two to about thirty carbon atoms, and R₅ is a monovalent organic radical as defined above in the case of R₁, R₂ and R₃;

R₅ is hydrogen or a cation, in the case of the acid phosphites.

Also useful organic triphosphites are mixed heterocyclic-open chain phosphites of the type:

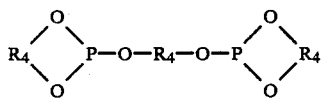

More complex triphosphites are formed from trivalent organic radicals, of the type:

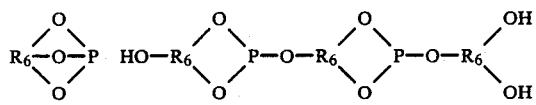

in which

R₆ is a trivalent organic radical of any of the types of R₁ to R₅, inclusive, as defined above.

A particularly useful class of complex triphosphites are the tetraoxadiphosphaspiro undecanes of the formula:

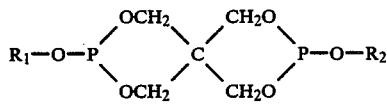

where

R₁ and R₂ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of R₁ and R₂ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

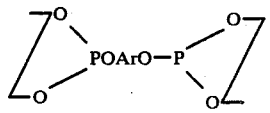

or

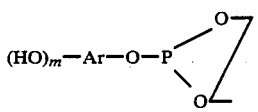

in which

Ar is a mono or bicyclic aromatic nucleus and m is an integer of from 0 to about 5.

Z is one or a plurality of organic radicals as defined above for R₁ to R₆, taken singly or together in sufficient number to satisfy the valences of the two phosphite oxygen atoms.

One or both

Z radicals is also hydrogen, in the case of the acid phosphites, and can include additional bicyclic aromatic groups of the type (HO)ₘ-Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri-(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite), tri-α-naphthyl phosphite, tri(phenylphenyl) phosphite, tri(2-phenylethyl) phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritol diphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane, 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraoxa-3,9-diphosphaspiro-(5,5)-undecane, 3,9-di(ethoxyethyloxy)-2,4,8,10-tetraoxa-3,9-diphosphaspiro-(5,5)-undecane, 3,9-di(butoxyethyloxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(butoxyethoxyethyloxy)-2,4,8,10-tetraoxa-3,9-diphosphaspiro-(5,5)-undecane, 3,9-di(methoxyethoxyethoxyethyloxy)-2,4,8,10-tetraoxa-3,9-diphosphaspiro-(5,5)-undecane, 3,9-di(methoxy(polyethoxy)ethyloxy)-2,4,8,10-tetraoxa-3,9-diphosphaspiro-(5,5)-undecane where the (polyethoxy) ethyloxy group has an average molecular weight of 350),3,9-di(methoxy(polyethoxy)ethyloxy)-2,4,8,10-tetraoxa-3,9-diphosphaspiro-(5,5)-undecane (where the (polyethoxy) ethyloxy group has an average molecular weight of 550).

Exemplary of the bis aryl triphosphites are: bis(4,4'-thio-bis(2-tertiary-butyl-5-methyl-phenol)) isooctyl phosphite, mono(4,4'-thio-bis(2-tertiary-butyl-5-methyl-phenol)) di-phenyl phosphite, tri-(4,4'-n-butylidene-bis(2-tertiary-butyl-5-methylphenyl)) phosphite, (4,4'-benzylidene-bis(2-tertiary-butyl-5-methyl-phenol)) di-phenyl phosphite, isooctyl 2,2'-bis(-parahydroxyphenyl) propane phosphite, decyl 4,4'-n-butylidene-bis(2-tertiary-butyl-5-methylphenol) phosphite, tri-4,4'-thio-bis(2-tertiary-butyl-5-methylphenol) phosphite, 2-ethylhexyl-2,2'-methylene-bis(4-methyl-6,1'-methylcyclohexyl) phenol phosphite, tri(2,2'-bis-(para-hydroxyphenyl) propane) phosphite, tri(4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl-4,4'-n-butylidene-bis(2-tertiary-butyl-5-methylphenyl) diphosphite, tetra-isooctyl-4,4'-thio-bis(2-tertiary-butyl-5-methylphenyl) diphosphite, 2,2'-methylene-bis(4-methyl-6,1'-methyl cyclohexyl phenyl) polyphosphite, isooctyl-4,4'-isopropylidene-bisphenyl polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butylidene bis(2-tertiarybutyl-5-methyl-phenyl) diphosphite, tetra-tridecyl-4,4'-isopropylidene bisphenyl diphosphite, hexa-tridecyl butane-1,1,3-tris(2'-methyl-5'-tertiary-butylphenyl-4') triphosphite.

Exemplary acid phosphites are di(phenyl) phosphite, monophenyl phosphite, mono(diphenyl) phosphite, dicresyl phosphite, di-(o-isooctylphenyl) phosphite, di(p-ethylhexylphenyl) phosphite, di(p-t-octylphenyl) phosphite, di(dimethylphenyl) phosphite, di-n-butyl phosphite, di-2-ethylhexyl phosphite, mono-2-ethylhexylphosphite, diisooctyl phosphite, monoisooctyl phosphite, monododecyl phosphite, 2-ethylhexyl phenyl phosphite, 2-ethylhexyl-(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-(2-phenyl ethyl) phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methylphenol)) phosphite, (4,4'-thio-bis(2-tertiary-butyl-5-methylphenol)) phenyl phosphite, bis(4,4'-n-butylidene-bis(2-tertiary-butyl-5-methylphenol)) phosphite, mono(4,4'-benzylidene-bis(2-tertiary-butyl-5-methylphenol)) phosphite, mono(2,2'-bis-(parahydroxyphenyl) propane) phosphite, mono(4,4'-butylidene-bis(2-tertiary-butyl-5-methylphenol) phosphite, bis(4,4'-thio-bis(2-tertiary-butyl-5-methylphenol)) phosphite, mono-2-ethylhexyl-mono-2,2'-methylene-bis(4-methyl-6,1'-methylcyclohexyl) phenol phosphite, bis(2,2'-bis(para-hydroxyphenyl)propane) phosphite, monoisooctylmono(4,4'-thio-bis(2-tertiary-butyl-5-methylphenol)) phosphite, isooctyl-(2,6-bis(2'-hydroxy-3,5-dinonylbenzyl)-4-nonylphenyl)) phosphite, tri-tridecyl-4,4'-n-butylidene-bis(2-tertiary-butyl-5-methylphenyl) diphosphite, tri-isooctyl-4,4'-thio-bis(2-tertiary-butyl-5-methylphenyl) diphosphite, bis(2,2'-methylene-bis(4-methyl-6,1'-methyl cyclohexyl phenyl)) phosphite, isooctyl-4,4'-isopropylidene-bis-phenyl phosphite, monophenyl mono(2,2'-methylene-bis(4-methyl-6,1'-methyl-cyclohexyl)) triphosphite, di-tridecyl-4,4'-oxydiphenyl diphosphite, di-n-dodecyl-4,4'-n-butylidene-bis(2-tertiary-butyl-5-methylphenyl) diphosphite, di-tridecyl-4,4'-isopropylidene bisphenyl diphosphite, tetra-tridecyl butane-1,1,3-tris(2'-methyl-5-tertiary-butylphenyl-4)-triphosphite.

The thiodipropionic acid ester has the following formula:

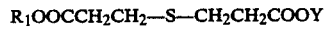

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylenearylene and mixed alkylenecycloalkylene radicals; hydroxyalkylene and hydroxyalkyloxyalkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

$R_1OOCCH_2CH_2SCH_2CH_2COOH$ (a)

$R_1OOCCH_2CH_2SCH_2CH_2COOR_2$ (b)

$R_1O[OCCH_2CH_2SCH_2CH_2COOX—O]$-$_nOCCH_2CH_2SCH_2CH_2COOZ$ (c)

$R_1OOCCH_2CH_2SCH_2CH_2COOM$ (d)

In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

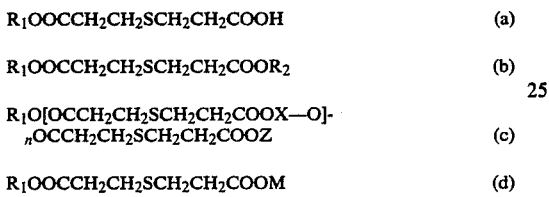

arylene radicals such as phenylene 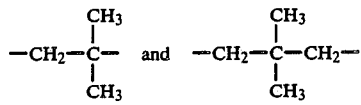

methylenephenylene 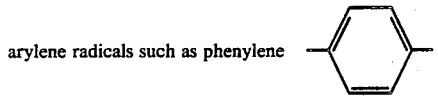

dimethylene phenylene 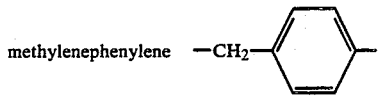

and alicyclylene such as cyclohexylene 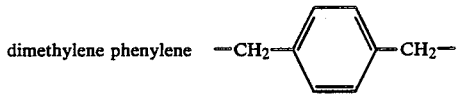

and cyclopentylene 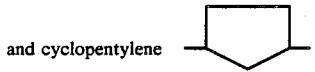

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monosterate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al Japanese patent No. 16,286/68 having the formula:

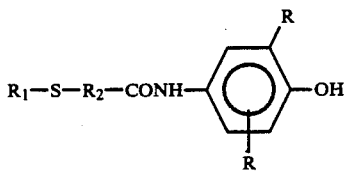

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al Japanese patent No. 20,366/68 having the formula:

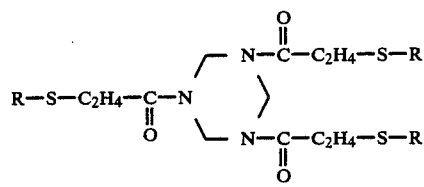

R is alkyl of eight to eighteen carbon atoms.

(3) Bis-thioalkanoic acid acmides of Yamamoto et al Japanese patent No. 23,765/68 having the formula:

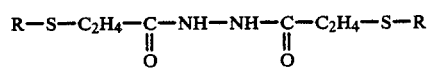

R is alkyl of more than six carbon atoms, aryl or aralkyl.

(4) Bis-thioalkylanoic acid amides of Ozeki et al Japanese patent No. 26,184/69 having the formula:

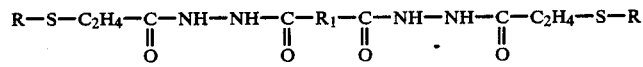

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese patent No. 31,464/69 having the formula:

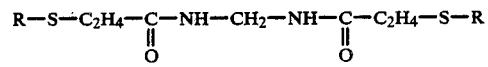

R is alkyl of more than six carbon atoms, aryl, or aralkyl.

(6) Thioalkanoic acid amide derivatives of Minagawa et.al, published Japanese application No. 106,484/74 having the formula:

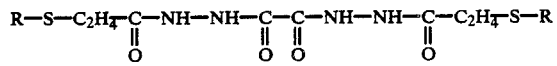

R is hydrocarbyl of one to twenty carbon atoms.

(7) Alkylene bis-thioalkanoic acid amides of U.S. Pat. No. 4,279,805 to Ohzeki et al, patented Jul. 21, 1981, having the general formula:

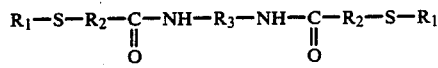

wherein:
$R_1$ is alkyl having from one to about fifty carbon atoms;
$R_2$ is alkylene having from one to about three carbon atoms; and
$R_3$ is alkylene having from about two to about twelve carbon atoms.

β-Alkylthiopropionic acid esters having the general formula:

wherein:
R is alkyl of four to twenty carbon atoms;
n is a number from 1 to 6; and
R' is the residue of an alcohol having from one to six hydroxyl groups.

Pentaerythritol tetra dodecyl thio propionate is an example of this group.

The organotin compounds include the alkyl tin carboxylates, such as mono-, di- and tri-methyl, butyl and octyl tin octoate; laurate; myristate; palmitate; stearate; isostearate; maleate; monobutylmaleate; monobenzylmaleate; monoolylmaleate; and monostearylmaleate; the alkyl tin mercaptides such as mono, di and tri methyl, butyl and octyl tin mercaptides; the alkyl tin sulfides; such as mono, di and tri methyl, butyl and octyl tin sulfides; the alkyl tin mercaptide/sulfides such as mono, di and tri methyl, butyl and octyl tin mercaptide-sulfides; and the alkyl tin mercaptocarboxylates such as mono, di and tri methyl, butyl and octyl tin butyl and isooctyl thioglycolates and thiopropionates.

The preferred amount of organotin compound is within the range from about 0.2 to about 5 parts, preferably from about 0.5 to about 3 parts, by weight per 100 parts by weight of polyvinyl chloride resin.

Additional heat stabilizers which can be employed with the stabilizers of the invention include β-aminocrotonates, such as 1,4-butanediol bis(β-aminocrotonate) and thiodiglycol bis(β-aminocrotonate); ureas such as diphenylurea and diphenylthiourea; indoles such as α-phenylindole and α-(octylphenyl) indole; dihydropyridines such as 2,6-dimethyl-3,5-di(carbooctoxy)-1,4-dihydropyridine and 2,6-dimethyl-3,5-di(carbolauryloxy)-1,4-dihydropyridine; β-diketones such as dibenzoylmethane, benzoylacetone, stearoylbenzoylmethane, caproylbenzoylmethane and dehydroacetic acid; and polyols, such as trimethylolpropane, glycerol, tris(2-hydroxyethyl)isocyanurate, pentaerythritol, dipentaerythritol, mannitol, sorbitol, pentaerythritolmonostearate, dipentaerythritoladipate and dipentaerythritolmono(pyrollidonecarboxylate).

Other conventional light stabilizers can be employed, such as hydroxybenzophenones such as 2-hydroxy-4-methoxybenzophenone, 2-hydroxy-4-n-octoxy benzophenone, 2,4dihydroxybenzophenone, benzotriazoles, such as 2(2 hydroxy-5-methylphenyl) benzotriazoles, 2(2-hydroxy 3-t-butyl-5-methylphenyl)-5 chlorobenzotriazole, 2(2-hydroxy-3-5-di-t-butylphenyl)-5-chlorobenzotriazole, 2(2-hydroxy-3,5-di-t-amylphenyl) benzotriazole, benzoates such as phenylsalicylate, 2,4-di-t-butylphenyl-3,5-di-t-butyl-4-hydroxy phenylbenzoate, nickel compounds such as nickel 2,2'-thiobis(4-t-octyl-phenolate), nickel monoethyl(3,5-di-t-butyl-4-hydroxybenzyl) phosphonate, substituted acrylonitriles such as methyl-$\alpha$-cyano-$\beta$-methyl-$\beta$-(p methoxy phenyl) acrylate and oxalic anilides such as N-2 ethyl phenyl-N'-2-ethoxy-5-t-butylphenyl oxalic diamide, N 2-ethyl phenyl-N'-2-ethoxy phenyl oxalic diamide.

A sufficient amount of the stabilizer combination is used to improve the resistance of the synthetic polymer to deterioration in physical properties when exposed to heat and light, including, for example, discoloration, reduction in melt viscosity and embrittlement. Very small amounts are usually adequate Amounts within the range from about 0.001 to about 10% total stabilizers including the stabilizer combinations of the invention by weight of the polymer are satisfactory. Preferably, from 0.01 to 5% is employed for optimum stabilization.

The stabilizer compositions of the invention comprise a blend of:
(a) 2,2,6,6-tetramethyl piperidyl compound in an amount of from about 10 to about 35 parts by weight;
(b) ammonium or metal perchlorate in an amount of from about 10 to about 35 parts by weight;
and optionally:
(c) a phenolic antioxidant in an amount from about 10 to about 35 parts by weight; and/or
(d) other heat or light stabilizers in an amount of from about 10 to about 35 parts by weight.

The stabilizer compositions of the invention can be employed in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile butadienes-tyrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

The stabilizer or combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

These polyvinyl chloride resin compositions can be backed with polyurethane foam in any desired thickness, simply by introducing a sheet of the polyvinyl chloride resin composition (after mixing with a stabilizer and sheeting off, as described above) together with polyol and polyisocyanate in a mold. The polyvinyl chloride resin sheet backed with polyurethane foam is obtained after curing.

Polyurethane foams are well known materials, and polyvinyl chloride resin compositions backed with polyurethane foams are also well known, and are prepared by conventional procedures.

Polyurethane foams are prepared by reaction of a polyol with a polyisocyanate, usually in the presence of a foaming agent such as water or trichlorofluoromethane.

Polyols to prepare polyurethane foam include polyether polyols; and polyester polyols. Examples of polyether polyols are glycols such as poly(oxypropylene) glycol, poly(oxyethylene/oxypropylene) glycol, poly(oxytetramethylene) glycol, poly(oxyethylene) glycol and triols such as poly(oxyethylene) and/or (oxypropylene) triols (examples of triols are glycerol, trimethylol propane, and trimethylol ethane).

Polyester polyols are prepared by reaction of dibasic carboxylic acids (adipic acid, phthalic acid, maleic acid, etc.) with polyols (ethyleneglycol, propyleneglycol, butyleneglycol, diethyleneglycol, trimethylol propane, glycerol, hexanetriol, pentaerythritol, etc.) and have terminal hydroxyl groups.

The polyisocyanates include 2,4-tolylene diisocyanate, 4,4'-diphenylmethane diisocyanate, hexamethylene diisocyanate, xylylene diisocyanate, 1,5-naphthalene diisocyanate, isophorone diisocyanate and triphenylmethane diisocyanate.

Water is normally used as the foaming agent, and when the polyol contains a sufficient amount of water, then addition of water is not necessary.

The curing temperature is selected from a wide range, usually from 20° to about 200° C., and the curing time depends on curing temperature. The higher the curing temperature, the shorter the curing time needed. From 1 to 60 minutes curing time is sufficient.

Adhesion of the polyvinyl chloride resin sheet to polyurethane foam can be obtained without any treatment. The sheet is set at the bottom of the mold, and polyol/isocyanate is at the top of the mold. Curing then results in the polyurethane resin foam-backed sheet.

The following Examples represent preferred embodiments of polyvinyl chloride resin compositions in accordance with the invention.

EXAMPLES 1 TO 7

| Ingredient | Parts by Weight |
|---|---|
| Polyvinyl chloride homopolymer (P = 1000) | 100 |
| Di($C_{9-11}H_{19-23}$) phthalate | 50 |
| Calcium carbonate | 10 |
| Epoxidized soybean oil | 2 |
| Ba stearate | 1 |
| Zn laurate | 0.5 |

| Ingredient | Parts by Weight |
| --- | --- |
| Stabilizer as shown in Table I | |

The compositions were thoroughly blended on a two-roll mill, and then compression-molded to form sheets 1 mm thick. These sheets were placed in a metal mold, and polyol and polyisocyanate introduced to prepare a polyurethane foam layer 10 mm thick. The polyol was a mixture of 90 parts by weight of the adduct of glycerol with hexyleneoxide/propyleneoxide [poly-(oxyethylene/oxypropylene) glycerol] having a molecular weight 2000, and 10 parts by weight of tetrahydroxypropyl ethylenediamine. The isocyanate was 42 parts by weight of diphenylmethane diisocyanate. The foaming agent was 1.3 parts by weight of water, and 0.9 part by weight of triethylenediamine was used as a catalyst. This mixture was placed in the mold and cured at 40°–45° C. for 20 minutes. The polyvinyl chloride sheets backed with polyurethane foam were obtained after curing. Test pieces were cut off from the sheets and heated at 120° C. in a Geer oven. The test pieces were exposed to ultraviolet light in a carbon arc Fade-O-Meter at 83° C. The color of the test pieces after exposure to heat and light was rated on the following scale:

| Color Scale | Color |
| --- | --- |
| 1 | Colorless |
| 2 | Pale yellow tint |
| 3 | Pale yellow |
| 4 | Pale to light yellow |
| 5 | Light yellow |
| 6 | Light to medium yellow |
| 7 | Medium yellow |
| 8 | Dark yellow |
| 9 | Yellow and black |
| 10 | Black |

The results are shown in Table I.

TABLE I

| | | | Color Rating | | | | | | |
| --- | --- | --- | --- | --- | --- | --- | --- | --- | --- |
| | | | After heating at 120° C. | | | | After exposure to ultraviolet light | | |
| Example No. | Stabilizer | phr. | Original | 100 hrs | 200 hrs | 400 hrs | Original | 100 hrs | 200 hrs | 300 hrs |
| Control 1 | None | | 1 | 10 | — | — | 1 | 10 | — | — |
| Control 2 | Ba perchlorate | 0.1 | 1 | 4 | 7 | 10 | 1 | 6 | 10 | — |
| Control 3 | Ba perchlorate | 0.2 | 1 | 1 | 4 | 7 | 1 | 6 | 9 | — |
| Control 4 | Bis(2,2,6,6-tetramethyl-4-piperidyl)-di(iso-tridecyl)-1,2,3,4-butane-tetracarboxylate | 0.1 | 1 | 10 | — | — | 1 | 6 | 9 | — |
| Control 5 | Bis(2,2,6,6-tetramethyl-4-piperidyl)-di(iso-tridecyl)-1,2,3,4-butane-tetracarboxylate | 0.2 | 1 | 10 | — | — | 1 | 5 | 8 | 10 |
| Example 1 | Ba perchlorate<br>Bis(2,2,6,6-tetramethyl-4-piperidyl)sebacate | 0.1<br>0.1 | 1 | 1 | 4 | 6 | 1 | 1 | 2 | 5 |
| Example 2 | Ba perchlorate<br>Tetra(2,2,6,6-tetramethyl-4-piperidyl)-1,2,3,4-butane-tetracarboxylate | 0.1<br>0.1 | 1 | 1 | 3 | 6 | 1 | 1 | 1 | 4 |
| Example 3 | Ba perchlorate<br>Bis(1,2,2,6,6-penta-methyl-4-piperidyl)-di(isotridecyl)-1,2,3,4-butane-tetracarboxylate | 0.1<br>0.1 | 1 | 1 | 3 | 6 | 1 | 1 | 1 | 4 |
| Example 4 | Ba perchlorate<br>Bis(2,2,6,-tetramethyl-4-piperidyl)-di(isotri-decyl)-1,2,3,4-butane-tetracarboxylate | 0.1<br>0.1 | 1 | 1 | 3 | 6 | 1 | 1 | 1 | 4 |
| Example 5 | Ba perchlorate<br>Bis(2,2,6,6-tetramethyl-4-piperidyl)-di(isotri-decyl)-1,2,3,4-butane-tetracarboxylate | 0.1<br>0.2 | 1 | 1 | 3 | 5 | 1 | 1 | 1 | 3 |
| Example 6 | NH4 perchlorate<br>Bis(1,2,2,6,6-penta-methyl-4-piperidyl)-di(isotridecyl)-1,2,3,4-butane-tetracarboxylate | 0.1<br>0.1 | 1 | 1 | 3 | 7 | 1 | 1 | 3 | 6 |
| Example 7 | Mg perchlorate<br>3,9-Bis(1,1-dimethyl-2-(tris(1,2,2,6,6-pentamethyl-4-piperidyl-oxycarbonyl)butyl-carbonyloxy)ethyl)-2,4,8,10-tetraoxaspiro[5.5]undecane | 0.1<br>0.1 | 1 | 1 | 3 | 5 | 1 | 1 | 2 | 6 |

The superiority of the stabilizer combinations of the invention when compared to either perchlorate or 2,2,6,6-tetramethyl piperidyl compound alone is apparent from the data.

EXAMPLES 8 TO 14

| Ingredient | Parts by Weight |
| --- | --- |
| Polyvinyl chloride homopolymer (P = 1000) | 100 |
| Di($C_{9-11}H_{19-23}$) phthalate | 50 |
| Calcium carbonate | 10 |
| Epoxidized soybean oil | 2 |
| Ba stearate | 1 |
| Zn laurate | 0.5 |
| Stabilizer as shown in Table II | |

The compositions were thoroughly blended on a two-roll mill and then compression-molded to form sheets 1 mm thick. Test pieces were cut off from the sheets and heated at 120° C. in a Geer oven. The test pieces were exposed to ultraviolet light in a carbon arc Fade-O-Meter at 83° C. The color of the test pieces was rated, and the results are shown in Table II.

EXAMPLES 15 TO 21

Polyvinyl chloride resin compositions were prepared according to the following formulation:

| Ingredient | Parts by Weight |
| --- | --- |
| Polyvinyl chloride homopolymer (paste resin: P = 1500) | 100 |
| Tri($C_{7-9}H_{15-19}$) trimellitate | 60 |
| Calcium carbonate | 15 |
| Epoxidized linseed oil | 4 |
| Hydrotalcite (DHT 4A:Kyowa Chemical) | 0.5 |
| Ba/Zn 2-ethyl hexoate liquid stabilizer | 2 |
| Blue pigment | 4 |
| Stabilizer as shown in Table III | |

The ingredients were thoroughly blended to prepare a paste sol. The sol was heat coated on a ferrous plate and heated at 200° C. for 5 minutes to prepare sheets 1 mm thick. These sheets were placed in a metal mold and

TABLE II

| | | | Heat stability at 190° C. | Color Rating | | | | | | | |
| --- | --- | --- | --- | --- | --- | --- | --- | --- | --- | --- | --- |
| | | | | After heating at 120° C. | | | | After exposure to ultraviolet light | | | |
| Example No. | Stabilizer | phr. | | Original | 100 hrs | 200 hrs | 400 hrs | Original | 100 hrs | 200 hrs | 300 hrs |
| Control 1 | None | | 150 | 1 | 5 | 8 | 10 | 1 | 7 | 10 | — |
| Control 2 | Ba perchlorate | 0.1 | 135 | 1 | 2 | 3 | 6 | 1 | 5 | 9 | — |
| Control 3 | Ba perchlorate | 0.2 | 120 | 1 | 2 | 5 | 10 | 1 | 4 | 8 | — |
| Control 3 | Bis(2,2,6,6-tetramethyl-4-piperidyl)-di(isotridecyl)-1,2,3,4-butane-tetracarboxylate | 0.1 | 150 | 1 | 5 | 7 | 9 | 1 | 4 | 8 | 10 |
| Control 5 | Bis(2,2,6,6-tetramethyl-4-piperidyl)-di(isotridecyl) 1,2,3,4-butanetetracarboxylate | 0.2 | 160 | 1 | 4 | 6 | 9 | 1 | 3 | 6 | 8 |
| Example 8 | Ba perchlorate | 0.1 | | | | | | | | | |
| | Bis(2,2,6,6-tetramethyl-4-piperidyl)sebacate | 0.1 | 165 | 1 | 1 | 3 | 6 | 1 | 1 | 2 | 4 |
| Example 9 | Ba perchlorate | 0.1 | | | | | | | | | |
| | Tetra(2,2,6,6-tetramethyl-4-piperidyl)-1,2,3,4-butane-tetracarboxylate | 0.1 | 165 | 1 | 1 | 3 | 6 | 1 | 1 | 1 | 4 |
| Example 10 | Ba perchlorate | 0.1 | | | | | | | | | |
| | Bis(1,2,6,6-pentamethyl-4-piperidyl)-di(isotridecyl)-1,2,3,4-butane-tetracarboxylate | 0.1 | 170 | 1 | 1 | 3 | 6 | 1 | 1 | 1 | 4 |
| Example 11 | Ba perchlorate | 0.1 | | | | | | | | | |
| | Bis(2,2,6,6-tetramethyl-4-piperidyl) di(isotridecyl)-1,2,3,4-butane-tetracarboxylate | 0.1 | 165 | 1 | 1 | 3 | 6 | 1 | 1 | 1 | 4 |
| Example 12 | Ba perchlorate | 0.1 | | | | | | | | | |
| | Bis(2,2,6,6-tetramethyl-4-piperidyl) di(isotridecyl)-1,2,3,4-butane-tetracarboxylate | 0.2 | 175 | 1 | 1 | 3 | 5 | 1 | 1 | 1 | 2 |
| Example 13 | $NH_4$ perchlorate | 0.1 | | | | | | | | | |
| | Bis(1,2,2,6,6-pentamethyl-4 piperidyl)-di(isotridecyl) 1,2,3,4-butane-tetracarboxylate | 0.1 | 165 | 1 | 1 | 3 | 7 | 1 | 1 | 2 | 5 |
| Example 14 | Mg perchlorate | 0.1 | | | | | | | | | |
| | 3,9-Bis(1,1-dimethyl 2 (tris(1,2,2,6,6-pentamethyl-4 piperidyloxycarbonyl) butylcarbonyloxy)ethyl) 2,4,8,10-tetraoxaspiro [5.5] undecane | 0.1 | 165 | 1 | 1 | 3 | 5 | 1 | 1 | 2 | 5 |

The superiority of the stabilizer combinations of the invention when compared to either perchlorate or 2,2,6,6-tetramethyl piperidyl compound alone is apparent from the data.

polyol and polyisocyanate introduced to prepare a polyurethane foam layer 10 mm thick. The polyvinyl chloride resin sheet backed with polyurethane foam were obtained after curing. Test pieces were cut off from the sheets and heated at 120° C. in a Geer oven.

The test pieces were exposed to ultraviolet light in a carbon arc Fade-O-Meter at 83° C. The color of the test pieces was rated and the results are shown in Table III.

-continued

| Ingredient | Parts by Weight |
|---|---|
| Epoxidized linseed oil | 4 |

TABLE III

| | | | Color Rating | | | | | | |
|---|---|---|---|---|---|---|---|---|---|
| | | | Original | After heating at 120° C. | | | Original | After exposure to ultraviolet light | | |
| Example No. | Stabilizer | phr. | | 100 hrs | 300 hrs | 500 hrs | | 200 hrs | 300 hrs | 400 hrs |
| Control 1 | None | | 1 | 8 | 10 | — | 1 | 9 | 10 | — |
| Control 2 | Ba perchlorate | 0.1 | 1 | 5 | 7 | 10 | 1 | 7 | 9 | — |
| Control 3 | Ba perchlorate | 0.2 | 1 | 4 | 5 | 7 | 1 | 6 | 8 | 10 |
| Control 4 | Bis(2,2,6,6-tetramethyl-4 piperidyl)-di(isotridecyl)-1,2,3,4-butane-tetracarboxylate | 0.1 | 1 | 7 | 10 | — | 1 | 5 | 7 | 10 |
| Control 5 | Bis(2,2,6,6-tetramethyl-4-piperidyl)-di(isotridecyl) 1,2,3,4-butane-tetracarboxylate | 0.2 | 1 | 6 | 9 | 10 | 1 | 4 | 7 | 9 |
| Example 15 | Ba perchlorate<br>Bis(2,2,6,6-tetramethyl-4-piperidyl)sebacate | 0.1<br>0.1 | 1 | 3 | 4 | 5 | 1 | 2 | 3 | 5 |
| Example 16 | Ba perchlorate<br>Bis(1,2,2,6,6-pentamethyl-4-piperidyl) sebacate | 0.1<br>0.1 | 1 | 3 | 4 | 5 | 1 | 2 | 3 | 5 |
| Example 17 | Ba perchlorate<br>Tris(2,2,6,6-tetramethyl-4-piperidyl) butane-tricarboxylate | 0.1<br>0.1 | 1 | 3 | 4 | 5 | 1 | 2 | 3 | 5 |
| Example 18 | Ba perchlorate<br>Tetra(2,2,6,6-tetramethyl-4-piperidyl)-1,2,3,4-butane-tetracarboxylate | 0.1<br>0.1 | 1 | 2 | 3 | 3 | 1 | 1 | 2 | 4 |
| Example 19 | Ba perchlorate<br>Bis(2,2,6,6-pentamethyl-4-piperidyl)di(isotridecyl)-1,2,3,4-butane-tetracarboxylate | 0.1<br>0.1 | 1 | 2 | 3 | 4 | 1 | 1 | 2 | 4 |
| Example 20 | Mg perchlorate<br>Tetra(1,2,2,6,6-pentamethyl-4-piperidyl)-1,2,3,4-butane-tetracarboxylate | 0.1<br>0.1 | 1 | 3 | 4 | 4 | 1 | 2 | 3 | 5 |
| Example 21 | Mg perchlorate<br>Bis(2,2,6,6-tetramethyl-4-piperidyl)di(isotridecyl)-1,2,3,4-butane-tetracarboxylate | 0.1<br>0.1 | 1 | 4 | 4 | 5 | 1 | 1 | 2 | 4 |

The superiority of the stabilizer combinations of the invention when compared to either perchlorate or 2,2,6,6-tetramethyl piperidyl compound alone is apparent from the data.

EXAMPLES 22 TO 26

Polyvinyl chloride resin compositions were prepared according to the following formulation:

| Ingredient | Parts by Weight |
|---|---|
| Polyvinyl chloride homopolymer (paste resin: P = 1500) | 100 |
| Trioctyltrimellitate | 50 |
| Calcium carbonate | 15 |
| Blue pigment | 2 |
| Hydrotalcite (DHT-4A:Kyowa Chemical) | 0.5 |
| Ba/Zn 2-ethylhexoate liquid stabilizer | 1.5 |
| Tetra(tridecyl)Bisphenol-A disphosphite | 0.5 |
| Stabilizer as shown in Table IV | |

The ingredients were thoroughly blended to prepare a paste sol. The sol was hand coated on a ferrous plate, and heated at 200° C. for 5 minutes to prepare sheets 1 mm thick. These sheets were placed in a metal mold, and polyol and polyisocyanate introduced to prepare a polyurethane foam layer 10 mm thick. The polyvinyl chloride resin sheet backed with polyurethane foam was obtained after curing. Test pieces were cut off from the sheets and heated at 120° C. in a Geer oven. The test pieces were exposed to ultraviolet light in a carbon arc Fade-O-Meter at 83° C. The color of the test pieces was rated as shown in Table IV.

TABLE IV

| | | | Color Rating | | | | | | |
|---|---|---|---|---|---|---|---|---|---|
| | | | Original | After heating 120° C. | | | Original | After exposure to ultraviolet light | | |
| Example No. | Stabilizer | phr. | | 100 hrs | 300 hrs | 500 hrs | | 200 hrs | 300 hrs | 400 hrs |
| Control 1 | None | | 1 | 7 | 10 | — | 1 | 8 | 10 | — |
| Control 2 | Ba perchlorate | 0.2 | 1 | 4 | 5 | 8 | 1 | 6 | 8 | 10 |
| Control 3 | Bis(2,2,6,6-tetramethyl-4-piperidyl)-di(isotridecyl)-1,2,3,4-butane- | 0.1 | 1 | 5 | 8 | 10 | 1 | 5 | 8 | 10 |

TABLE IV-continued

| Example No. | Stabilizer | phr. | Color Rating | | | | | | | |
|---|---|---|---|---|---|---|---|---|---|---|
| | | | After heating 120° C. | | | | After exposure to ultraviolet light | | | |
| | | | Original | 100 hrs | 300 hrs | 500 hrs | Original | 200 hrs | 300 hrs | 400 hrs |
| Example 22 | Ba perchlorate<br>Bis(2,2,6,6-tetramethyl-4-piperidyl)-di(isotri-decyl)-1,2,3,4-butane-tetracarboxylate | 0.1<br>0.1 | 1 | 3 | 4 | 5 | 1 | 1 | 4 | 5 |
| Example 23 | Ba perchlorate<br>Bis(2,2,6,6-tetramethyl-1-oxyl-4-piperidyl)-di(isotridecyl)-1,2,3,4-butane-tetracarboxylate | 0.1<br>0.1 | 1 | 3 | 3 | 4 | 1 | 2 | 3 | 5 |
| Example 24 | Ba perchlorate<br>3,9-(1,1-dimethyl-2-(tris(2,2,6,6-tetramethyl-4-piperidyloxycarbonyl)butylcarbonyloxy)ethyl)-2,4,8,10-tetraoxaspiro[5.5]undecane | 0.1<br>0.1 | 1 | 3 | 3 | 5 | 1 | 1 | 3 | 4 |
| Example 25 | Ba perchlorate<br>Condensate of 2-t-octylamino-4,6-dichloro-s-triazine with N,N'-bis(2,2,6,6-tetramethyl-4-piperidyl)hexamethylene-diamine | 0.1<br>0.1 | 1 | 3 | 3 | 4 | 1 | 2 | 3 | 4 |
| Example 26 | Ba perchlorate<br>Condensate of 1,6-bis(2,2,6,6-tetramethyl-4-piperidylamino)-hexane with dibromoethane | 0.1<br>0.2 | 1 | 3 | 3 | 4 | 1 | 1 | 4 | 5 |

The superiority of the stabilizer combinations of the invention when compared to either perchlorate or 2,2,6,6-tetramethyl piperidyl compound alone is apparent from the data.

EXAMPLES 27 TO 31

Polyvinyl chloride resin compositions were prepared according to the following formulation:

| Ingredient | Parts by Weight |
|---|---|
| Polyvinyl chloride homopolymer (P = 1000) | 90 |
| Polyvinyl chloride homopolymer (paste resin: P = 800) | 10 |
| Tri($C_{7-9}H_{15-19}$) trimellitate | 60 |
| Zeolite 4A | 3 |
| Titanium dioxide | 5 |
| Epoxidized soybean oil | 5 |
| Zn stearate | 0.5 |
| Tetra(tridecyl)Bisphenol-A disphosphite | 0.5 |
| Stabilizer as shown in Table V | |

The ingredients were thoroughly blended in a Henschel mixer to prepare powder compounds. The powder compounds were spread on a ferrous plate and heated at 200° C. for 5 minutes to prepare sheets 1 mm thick. The sheets were placed in a metal mold, and polyol and polyisocyanate introduced into the mold to prepare a polyurethane foam layer 10 mm thick. The polyvinyl chloride sheets backed with polyurethane foam were obtained after curing. The test pieces were cut off from the sheets and heated at 120° C. in a Geer oven. The test pieces were exposed to ultraviolet light in a carbon arc Fade-O-Meter at 83° C. The color of the test pieces was rated as shown in Table V.

TABLE V

| Example No. | Stabilizer | phr. | Color Rating | | | | | | | |
|---|---|---|---|---|---|---|---|---|---|---|
| | | | After heating at 120° C. | | | | After exposure to ultraviolet light | | | |
| | | | Original | 100 hrs | 200 hrs | 400 hrs | Original | 100 hrs | 200 hrs | 300 hrs |
| Control 1 | None | | 1 | 7 | 10 | — | 1 | 8 | 10 | — |
| Control 2 | Ba perchlorate | 0.2 | 1 | 2 | 5 | 7 | 1 | 6 | 9 | — |
| Control 3 | Bis(2,2,6,6-tetramethyl-4-piperidyl)-di(isotri-decyl)-1,2,3,4-butane-tetracarboxylate | 0.1 | 1 | 5 | 7 | 10 | 1 | 5 | 7 | 10 |
| Example 27 | Ba perchlorate<br>Bis(2,2,6,6-tetramethyl-4-piperidyl) sebacate | 0.1<br>0.1 | 1 | 1 | 4 | 5 | 1 | 2 | 4 | 5 |
| Example 28 | Ba perchlorate<br>Tetra(2,2,6,6-tetramethyl-4-piperidyl)-1,2,3,4-butane-tetracarboxylate | 0.1<br>0.1 | 1 | 1 | 3 | 4 | 1 | 2 | 4 | 5 |
| Example 29 | Ba perchlorate<br>Bis(1,2,2,6,6-pentamethyl-4-piperidyl)-di(isotri-decyl)-1,2,3,4-butane- | 0.1<br>0.1 | 1 | 1 | 3 | 5 | 1 | 1 | 2 | 4 |

TABLE V-continued

| | | | Color Rating | | | | | | |
|---|---|---|---|---|---|---|---|---|---|
| | | | After heating at 120° C. | | | | After exposure to ultraviolet light | | |
| Example No. | Stabilizer | phr. | Original | 100 hrs | 200 hrs | 400 hrs | Original | 100 hrs | 200 hrs | 300 hrs |
| Example 30 | tetracarboxylate Ba perchlorate Bis(2,2,6,6-tetramethyl-4-piperidyl)-di(isotridecyl)1,2,3,4-butane-tetracarboxylate | 0.1 0.1 | 1 | 1 | 3 | 4 | 1 | 1 | 2 | 4 |
| Example 31 | Ba perchlorate 3,9-Bis(1,1-dimethyl-2-(tris(1,2,2,6,6-pentamethyl-4-piperidyloxycarbonyl)butylcarbonyloxy)ethyl) 2,4,8,10-tetraoxaspiro [5.5] undecane | 0.1 0.1 | 1 | 1 | 3 | 4 | 1 | 1 | 2 | 4 |

The superiority of the stabilizer combinations of the invention when compared to either perchlorate or 2,2,6,6-tetramethyl piperidyl compound alone is apparent from the data.

EXAMPLES 32 TO 37

Polyvinyl chloride resin compositions were prepared according to the following formulation:

| Ingredient | Parts by Weight |
|---|---|
| Polyvinyl chloride homopolymer (P = 1100) | 100 |
| Tri(C$_{7-9}$H$_{15-19}$) trimellitate | 60 |
| Titanium dioxide | 5 |
| Epoxidized soybean oil | 5 |
| Ba/Cd laurate | 2.5 |
| Tetra(tridecyl)-4,4'-butylidenebis(2-t-butyl-5-methylphenyl)diphosphite | 0.5 |

| Ingredient | Parts by Weight |
|---|---|
| Stabilizer as shown in Table VI | |

The ingredients were thoroughly blended in a Henschel mixer to prepare powder compounds. The powder compounds were spread on a ferrous plate and heated at 200° C. for 5 minutes to prepare sheets 1 mm thick. The sheets were placed in a metal mold, and polyol and polyisocyanate introduced into the mold to prepare a polyurethane foam layer 10 mm thick. The polyvinyl chloride sheets backed with polyurethane foam were obtained after curing. The test pieces were cut off from the sheets and heated at 120° C. in a Geer oven. The test pieces were exposed to ultraviolet light in a carbon arc Fade-O-Meter at 83° C. The color of the test pieces was rated as shown in Table VI.

TABLE VI

| | | | Color Rating | | | | | | | |
|---|---|---|---|---|---|---|---|---|---|---|
| | | | After heating at 120° C. | | | | After exposure to ultraviolet light | | | |
| Example No. | Stabilizer | phr. | Original | 100 hrs | 200 hrs | 400 hrs | Original | 100 hrs | 200 hrs | 300 hrs |
| Control 1 | None | | 1 | 6 | 8 | 10 | 1 | 7 | 9 | — |
| Control 2 | Ba perchlorate | 0.2 | 1 | 4 | 6 | 8 | 1 | 5 | 8 | 10 |
| Control 3 | Bis(2,2,6,6-tetramethyl-4-piperidyl)-di(isotridecyl)-1,2,3,4-butane-tetracarboxylate | 0.1 | 1 | 5 | 8 | 10 | 1 | 5 | 7 | 9 |
| Example 32 | Ba perchlorate Bis(2,2,6,6-tetramethyl-4 piperidyl) sebacate | 0.1 0.1 | | | | | | | | |
| Example 33 | Ba perchlorate Tetra(2,2,6,6-tetramethyl-4-piperidyl)-1,2,3,4-butane-tetracarboxylate | 0.1 0.1 | 1 | 1 | 3 | 4 | 1 | 1 | 2 | 3 |
| Example 34 | Ba perchlorate Bis(1,2,2,6,6-pentamethyl-4-piperidyl)di(isotridecyl)-1,2,3,4-butane-tetra-carboxylate | 0.1 0.1 | 1 | 1 | 2 | 3 | 1 | 1 | 2 | 3 |
| Example 35 | Ba perchlorate bis(2,2,6,6-tetramethyl-4-piperidyl)-di(isotridecyl)-1,2,3,4-butane-tetracarboxylate | 0.1 0.1 | 1 | 1 | 2 | 3 | 1 | 1 | 2 | 3 |
| Example 36 | Ba perchlorate 3,9-Bis(1,1-dimethyl-2-(tris(2,2,6,6-tetramethyl-4-piperidyloxycarbonyl)butylcarbonyloxy)ethyl)-2,4,8,10-tetraoxaspiro [5.5] undecane | 0.1 0.1 | 1 | 1 | 2 | 3 | 1 | 1 | 2 | 3 |
| Example 37 | Ba perchlorate 3,9-Bis(1,1-dimethyl-2-(tris(1,2,2,6,6-pentamethyl-4-piperidyloxy- | 0.1 0.1 | 1 | 1 | 3 | 4 | 1 | 1 | 2 | 3 |

TABLE VI-continued

| | | | Color Rating | | | | | | |
|---|---|---|---|---|---|---|---|---|---|
| | | | After heating at 120° C. | | | | After exposure to ultraviolet light | | |
| Example No. | Stabilizer | phr. | Original | 100 hrs | 200 hrs | 400 hrs | Original | 100 hrs | 200 hrs | 300 hrs |
| | carbonyl)butylcarbonyloxy) ethyl)-2,4,8,10-tetra- oxaspiro [5.5] undecane | | | | | | | | | |

The superiority of the stabilizer combinations of the invention when compared to either perchlorate or 2,2,6,6-tetramethyl piperidyl compound alone is apparent from the data.

Having regard to the foregoing disclosure, the following is claimed as the inventive and patentable embodiments thereof:

1. A polyvinyl chloride resin composition having improved resistance to deterioration when exposed to heat and light comprising a polyvinyl chloride resin and a stabilizer composition capable of improving the resistance to deterioration of polyvinyl chloride resins when exposed to light and heat, comprising a 2,2,6,6-tetramethyl piperidinyl compound and an ammonium amine, or metal perchlorate selected from the group consisting of ammonium perchlorates and tertiary amine perchlorates; alkali metal perchlorates, alkaline earth metal perchlorates and aluminum perchlorates.

2. A polyvinyl chloride resin composition according to claim 1 in which the polyvinyl chloride resin is polyvinyl chloride homopolymer.

3. A polyvinyl chloride resin composition according to claim 1 in which the polyvinyl chloride resin is polyvinyl chloride paste resin.

4. A polyvinyl chloride resin composition according to claim 1, backed with a polyurethane resin foam.

5. A polyvinyl chloride resin composition according to claim 1, in which the metal perchlorate is magnesium perchlorate.

6. A polyvinyl chloride resin composition according to claim 1, in which the metal perchlorate is barium perchlorate.

7. A polyvinyl chloride resin composition according to claim 1, in which the metal perchlorate is an alkaline earth metal perchlorate.

8. A polyvinyl chloride resin composition according to claim 1, in which the 2,2,6,6-tetramethyl piperidinyl compound is bis(2,2,6,6-tetramethyl-4-piperidyl) sebacate.

9. A polyvinyl chloride resin composition according to claim 1, in which the 2,2,6,6-tetramethyl piperidinyl compound is tetra(2,2,6,6-tetramethyl-4-piperidyl)-1,2,3,4-butanetetracarboxylate.

10. A polyvinyl chloride resin composition according to claim 1, in which the 2,2,6,6-tetramethyl piperidinyl compound is bis(1,2,2,6,6-pentamethyl-4-piperidyl)-di-(isotridecyl)-1,2,3,4-butanetetracarboxylate.

11. A polyvinyl chloride resin composition according to claim 1, in which the 2,2,6,6-tetramethyl piperidinyl compound is bis(2,2,6,6-tetramethyl-4-piperidyl)-di-(isotridecyl)-1,2,3,4-butanetetracarboxylate.

12. A polyvinyl chloride resin composition according to claim 1, in which the 2,2,6,6-tetramethyl piperidinyl compound is 3,9-bis(1,1-dimethyl-2-(tris(1,2,2,6,6-pentamethyl-4-piperidyloxycarbonyl) butylcarbonyloxy)ethyl)2,4,8,10-tetraoxaspiro[5.5] undecane.

13. A polyvinyl chloride resin composition according to claim 1, in which the 2,2,6,6-tetramethyl piperidinyl compound is 3,9-bis(1,1-dimethyl-2-(tris(2,2,6,6-tetramethyl-4-piperidyloxycarbonyl) butylcarbonyloxy)ethyl)-2,4,8,10-tetraoxaspiro [5.5] undecane.

14. A polyvinyl chloride resin composition according to claim 1, comprising in addition a phenolic antioxidant.

15. A polyvinyl chloride resin composition according to claim 1, comprising in addition an organic phosphite.

16. A polyvinyl chloride resin composition according to claim 1, comprising in addition an organotin compound.

17. A polyvinyl chloride resin composition according to claim 1, comprising in addition a thioether.

18. A polyvinyl chloride resin composition according to claim 1, comprising in addition a polyvalent metal salt of organic acid.

* * * * *